Feb. 20, 1951 W. T. HOUSER 2,542,412
MINNOW BUCKET
Filed May 2, 1949
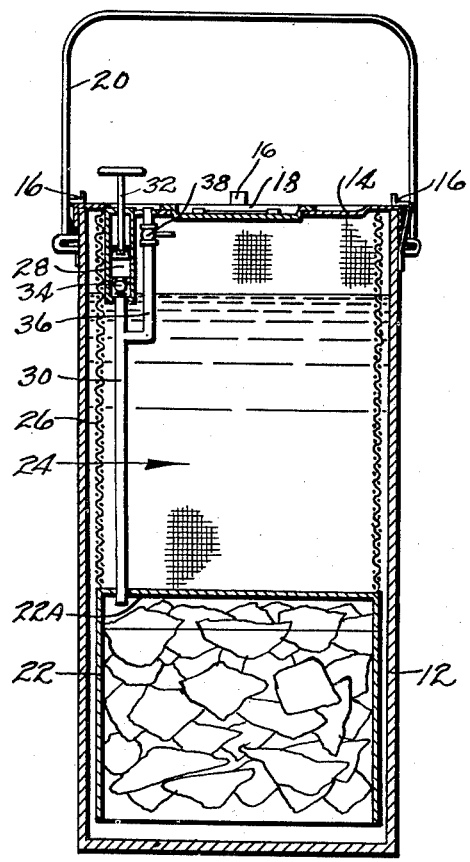
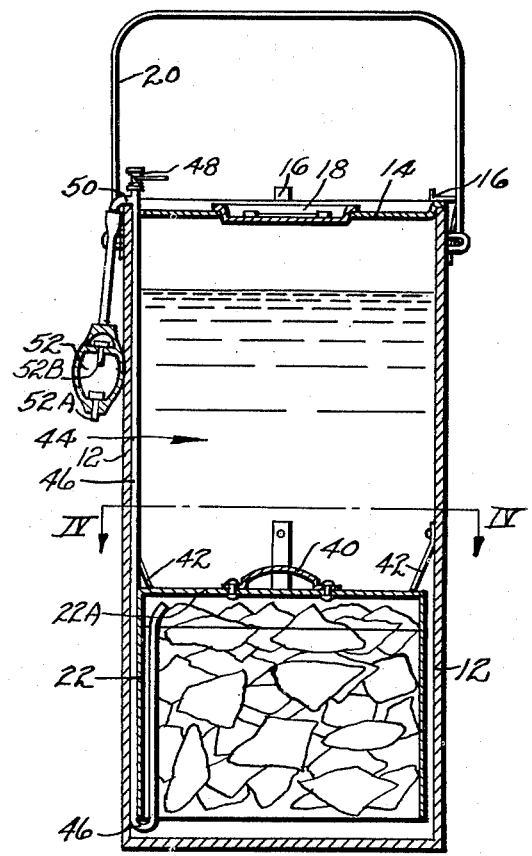
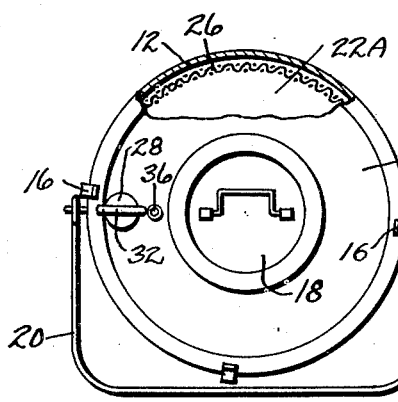
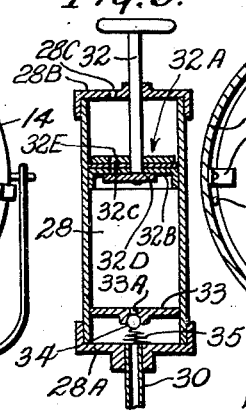
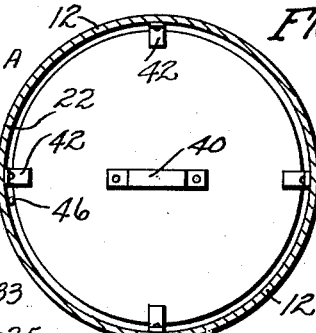
Inventor
WILLIAM T. HOUSER
By Weatherford and Weatherford
Attorneys Patented Feb. 20, 1951

2,542,412

UNITED STATES PATENT OFFICE 2,542,412

MINNOW BUCKET

William T. Houser, Memphis, Tenn.

Application May 2, 1949, Serial No. 90,973

3 Claims. (Cl. 43—57)

This invention relates to minnow buckets, such as are used by fishermen to hold minnows or other live bait, and particularly relates to buckets which use ice for cooling the water in which the minnows are kept, and to buckets which include means for aerating the water.

The need for cooling and aeration is well known and ice is obviously the best agent available for such use. Difficulty has been had, however, in the use of ice in regulating the cooling accomplished and overcooling as well as under cooling has resulted. If ice be kept above the bait container access to the bait in the container is difficult and if below recession on the one hand, of the ice by melting, if ice alone be used, results in under cooling; as on the other hand maintenance by floating of the ice in contact with the bottom of the container, if the ice compartment be water filled, creates over cooling and regulation has proved difficult if not substantially impossible.

The objects of the present invention are:

To provide a minnow bucket which includes aerating and cooling means;

To provide means for regulating the cooling action of the ice in an ice cooled minnow bucket;

To provide means in an ice cooled minnow bucket for transferring ice cold water into the minnow container;

To provide a minnow bucket having a minnow containing section and an ice holder section;

To provide means for aerating the water in the minnow container.

The means by which the foregoing and other objects of the present invention are accomplished and the manner of their accomplishment will readily be understood from the following specification upon reference to the accompanying drawings, in which:

Fig. 1 is a sectional elevational view of the preferred form of my minnow bucket.

Fig. 2 is a corresponding plan view partially broken away in section.

Fig. 3 is a sectional elevational view of a modified form of the bucket;

Fig. 4 a corresponding sectional plan view of the modified form, taken as on the line IV—IV of Fig. 3; and Fig. 5 is an enlarged sectional elevation of the pump shown in Fig. 1.

Referring now to the drawings in which the various parts are indicated by numerals, the device comprises a bucket 12 having a cover 13, preferably retained in place by clips 16, which may be manually displaced to release it. Centrally the cover is provided with a hand hole and removable caps 18 through which access for bait removal is had. The bucket is equipped with a carrying bail 20. Removably disposed in the bucket is an ice retainer 22 having an imperforate top 22A and imperforate sides, but being entirely open at the bottom. The top 22A also forms the bottom of the bait compartment 24.

In the form of the bucket shown in Figs. 1 and 2, a perforate wall structure 26, which may be of wire mesh, is secured to the peripheral edge of the top 22A of the ice retainer and extends upward therefrom to the underside of the cover 14 and is secured thereto to form the bait compartment, this wall structure serving to lower and push the ice retainer 12 down and to hold it in place when the cover 14 is latched in place.

Carried by the cover 14 and preferably depending therebelow, is an air pump having a barrel 28 closed at its lower end by a bottom 28A and at its upper end by a top 28B having air inlet opening 28C. A tube 30, communicating through the bottom 28A with the barrel, extends downward from the bottom through the top 22A of the retainer to which it is firmly attached and sealed. The pump is provided with a conventional plunger assembly 32 which may include a head portion 32A and a cup leather 32B forming part of the head. The head is provided with an aperture 32E, and the leather is provided with an alined aperture 32C and an underlying flap valve 32D closing these apertures under downward movement of the plunger. Adjacent its bottom, the barrel may have an intermediate head 33, provided with an aperture 33A, which is closed against return flow by a ball check valve 34, the ball being resiliently urged toward seating by an underlying spring 35 and preventing return flow through the tube 30 into the barrel 28. Below the check valve a branch tube 36 leads off from the tube 30 and extends upward through the cover 14 to discharge, the branch tube being provided with a cut-off valve 38.

In the form of the device shown in Figs. 3 and 4, the ice retainer 22 is preferably provided with a handle 40 secured to its top 22A. The retainer is held against displacement by manually displaceable clips 42, secured to the wall of the bucket. In this form the top 22A of the ice retainer, as before, forms the bottom of the bait compartment 44, but the wall of the bucket forms the wall of the compartment 44.

The cover 14 of the bucket is inwardly slotted from one side to receive a tube 46 which is of length to extend substantially to the bottom of the bucket and is there U bent and extended upward within the ice retainer 22 into adjacency with the under side of the top of the ice retainer. At its upper end the tube 46 terminates in a manually operable closure valve 48. Below the valve a branch tube 50 extends outward and is continued to pumping means 52, which may be of well known bulb type, with an inwardly opening valve 52A on its outer end, and a discharge valve 52B opening from, and preventing return flow of air to, said bulb.

In the Fig. 1 type, crushed or cubed ice in amount to fill the ice retainer is dumped into the bucket and the top 14 carrying the pump, the tubing, the ice retainer 22 and other parts, is pushed down until the retainer embraces the ice and the top 14 is seated and engaged and held by the clips 16.

In the Fig. 3 type, the pump and tube 46 are suspended from the top edge of the bucket, a like amount of ice is placed as before in the bucket and the ice retainer pushed down to embrace the ice and until the top of the retainer is engaged by the clips 42, after which the cover is placed and secured by the clips 16.

Air is then pumped in until all the water entrained with the ice is displaced from the ice retainer and the air bubbles up through the displaced water indicating that the water level in the retainer has reached the bottom edge of the retainer walls.

The bucket is then filled with water to a predetermined level below its top and is ready to receive the bait, usually minnows which are placed therein.

Initially the ice contacts the top of the ice retainer and effects rapid cooling of the water thereabove and surrounding it. As the ice melts air which filled the interstices rises and establishes an air space thereabove which reduces the cooling rate. Should the cooling be still too rapid, additional air may be pumped in, or if too slow, may be bled off by opening of the air valve 38, Fig. 1, or 48, Fig. 3, as the case may be. Also from time to time the water in the container may be agitated by pumping in air and forcing water from the ice retainer into the bait container thereabove until air bubbles through, then releasing the air through the air valve 38 or 48, as the case may be to establish the level of the water in the container, the operation being repeated as often as may be deemed necessary.

It will be understood that the foregoing description is illustrative only and is not intended as limiting the invention thereto, and that various modification in detail may be made without departing from the spirit and intent of the invention.

I claim:

1. In a device of the character described, a bucket, an ice retainer, open at the bottom and having imperforate top and imperforate sides, the ice retainer being disposed in said bucket adjacent its bottom, means for latching said retainer to the wall of said bucket, a tube leading into said retainer and terminating in adjacency to the top of said retainer, pumping means for discharging air through said tube into said retainer, valve means preventing return flow of air to said pump, and manually operable means by-passing said pumping means for releasing air from said retainer.

2. In a device of the character described, a bucket, a removable cover for said bucket, means for latching said cover to the bucket, an ice retainer, open at the bottom and having imperforate top and imperforate sides, said retainer being disposed in said bucket adjacent its bottom, means for holding the retainer in a spaced relation to the cover, a tube leading into said retainer and terminating in adjacency to the top of said retainer, pumping means for discharging air through said tube into said retainer, valve means preventing return flow of air to said pump, and manually operable means by-passing said pumping means for releasing air from said retainer.

3. In a device of the character described, a bucket, a removable cover for said bucket, an ice retainer, open at the bottom and having imperforate top and imperforate sides, disposed in said bucket adjacent its bottom, a perforate wall structure secured to the periphery of said top, extending upward therefrom and secured to the under side of said cover, means for latching said cover and said retainer to the bucket, a tube leading downward from the top of and within said bucket into said retainer and terminating in adjacency to the top of said retainer, pumping means for discharging air through said tube into said retainer, valve means preventing return air flow to said pump, and manually operable means by-passing said pumping means for releasing air from said retainer.

WILLIAM T. HOUSER.

REFERENCES CITED

The following references are of record in the file of this patent:

UNITED STATES PATENTS

| Number | Name | Date |
|---|---|---|
| 778,842 | Bouchard | Jan. 3, 1905 |
| 1,444,412 | Codner | Feb. 6, 1923 |
| 2,216,202 | Lake | Oct. 1, 1940 |